US012670268B2

(12) United States Patent
Hall-Zazueta et al.

(10) Patent No.: US 12,670,268 B2
(45) Date of Patent: Jun. 30, 2026

(54) SECURE EQUIPMENT ACCESS WITH SCREEN MONITORING ENFORCEMENT

(71) Applicant: Cisco Technology, Inc., San Jose, CA (US)

(72) Inventors: Fiona Hall-Zazueta, San Jose, CA (US); Michael Freed, Pleasanton, CA (US); Jason Trung Hoa Tang, San Jose, CA (US); Sravanth Yajamanam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 18/381,080

(22) Filed: Oct. 17, 2023

(65) Prior Publication Data

US 2024/0403452 A1      Dec. 5, 2024

Related U.S. Application Data

(60) Provisional application No. 63/470,551, filed on Jun. 2, 2023.

(51) Int. Cl.
| | |
|---|---|
| *G06F 21/60* | (2013.01) |
| *G06F 21/84* | (2013.01) |
| *G06F 3/14* | (2006.01) |
| *G06F 21/10* | (2013.01) |

(52) U.S. Cl.
CPC ............ *G06F 21/604* (2013.01); *G06F 21/84* (2013.01); *G06F 3/14* (2013.01); *G06F 21/1085* (2023.08)

(58) Field of Classification Search
CPC ..... G06F 21/604; G06F 21/84; G06F 21/1085
See application file for complete search history.

(56) References Cited

U.S. PATENT DOCUMENTS

| | | | |
|---|---|---|---|
| 10,505,998 B1 * | 12/2019 | Ackerman | .......... H04L 65/4025 |
| 10,614,229 B2 | 4/2020 | Lehmann et al. | |
| 2004/0075619 A1 * | 4/2004 | Hansen | .................. G06F 9/451 |
| | | | 345/1.1 |
| 2012/0144449 A1 * | 6/2012 | Peled | .................. G06F 21/6245 |
| | | | 726/1 |
| 2013/0007895 A1 | 1/2013 | Brolley et al. | |
| 2015/0242415 A1 * | 8/2015 | Martini | .............. H04L 63/1441 |
| | | | 707/694 |
| 2015/0244682 A1 * | 8/2015 | Biswas | ................. H04L 63/104 |
| | | | 726/26 |
| 2016/0173511 A1 * | 6/2016 | Bratspiess | ............... H04L 63/20 |
| | | | 726/23 |

(Continued)

OTHER PUBLICATIONS

Daniele Del Sale, Operational Technology Services to Support Business Activities, May 2021, University of Turku, pp. 1-71 (Year: 2021).*

(Continued)

*Primary Examiner* — Ellen Tran
(74) *Attorney, Agent, or Firm* — Lee & Hayes, P.C.

(57) ABSTRACT

In one embodiment, a method is disclosed comprising: detecting, by a processor, a remote access session from an accessing device to an accessed device; determining, by the processor, an access session screen-sharing security policy for the accessed device; and preventing, by the processor, the remote access session in response to a violation of the access session screen-sharing security policy.

20 Claims, 21 Drawing Sheets

(56)                    References Cited

U.S. PATENT DOCUMENTS

| | | | |
|---|---|---|---|
| 2016/0255139 A1* | 9/2016 | Rathod | H04L 51/046 |
| | | | 709/203 |
| 2017/0054760 A1 | 2/2017 | Barton et al. | |
| 2017/0068829 A1* | 3/2017 | Shaw | G06F 21/50 |
| 2017/0223066 A1* | 8/2017 | Grevers, Jr. | G06F 3/04842 |
| 2018/0121663 A1 | 5/2018 | Hassan et al. | |
| 2018/0253325 A1* | 9/2018 | Bao | G06F 9/452 |
| 2020/0014726 A1* | 1/2020 | Hasson | H04L 63/20 |
| 2020/0151345 A1* | 5/2020 | Chauhan | G06F 21/16 |
| 2022/0131878 A1* | 4/2022 | Tokosch | G06F 16/148 |
| 2023/0216947 A1* | 7/2023 | Bernardi | H04L 67/10 |
| | | | 713/150 |
| 2023/0370434 A1* | 11/2023 | Nadir | H04L 63/20 |

OTHER PUBLICATIONS

"Screen sharing", online: https://www.microsoft.com/en-us/microsoft-teams/screen-sharing, accessed Sep. 13, 2023, 6 pages, Microsoft.
"Team Viewer", online: https://en.wikipedia.org/wiki/TeamViewer, accessed Sep. 13, 2023, 8 pages, Wikimedia Foundation, Inc.
"User session recording", online: https://www.manageengine.com/products/active-directory-audit/configure-user-session-recording-guide.html, accessed Sep. 13, 2023, 5 pages, Zoho Corporation Pvt. Ltd.

* cited by examiner

500

ACCESS MANAGEMENT

ACCESS CONTROL GROUPS    USERS    ACTIVE SESSIONS    SESSION HISTORY

CONNECTED CLIENT ACCESS GROUPS (13)

🔍 SEARCH TABLE

+ ADD GROUP

| NAME ▲ | USERS | CONNECTED CLIENT ACCESS METHODS | GROUP ENABLED | ENFORCE SCREEN MONITORING & RECORDING | ENFORCE GUACAMOLE RECORDING |
|---|---|---|---|---|---|
| 01 SSH/VNC/RDP-TEST | 2 | 3 | ENABLED | NO | NO |
| 02 HTTP-TEST | 2 | 1 | ENABLED | NO | NO |
| 03 SEAPLUS-TEST | 2 | 1 | ENABLED | NO | NO |
| DEBUG | 2 | 6 | ENABLED | NO | NO |
| DEMO-929 | 0 | 1 | ENABLED | NO | NO |
| GUACRECORDING | 2 | 2 | ENABLED | NO | NO |
| SCHEDULED ACCESS - JAN. 23 WEEK | 2 | 1 | ENABLED | NO | NO |

ADD GROUP

GROUP DETAILS
NAME*
MONITORED ACCESS

DESCRIPTION

◯⚪ GROUP ENABLED    ◯⚪ ENFORCE MONITORING & RECORDING
   ⦿ ENFORCE SCREEN MONITORING & RECORDING
   ◯ ENFORCE SSH/VNC/RDP RECORDING
◯⚪ SCHEDULE SETTINGS

ACCESS MANAGEMENT / MONITORED ACCESS
MONITORED ACCESS

GROUP DETAILS ✎

| | |
|---|---|
| NAME | MONITORED ACCESS |
| DESCRIPTION | - |
| CREATION DATE | FEB 10, 2023 3:12 PM |
| GROUP ENABLED | ENABLED |
| ENFORCE SCREEN MONITORING & RECORDING | ON |
| ENFORCE GUACAMOLE RECORDING | OFF |

ASSIGNED USERS & CONNECTED CLIENT ACCESS

USERS (0)    CONNECTED CLIENT ACCESS (0)

🔍 SEARCH TABLE

+ ADD USERS

USER NAME ▲

---

ASSIGN IOT USERS

SEARCH OR FILTER LIST OF ORGANIZATION USERS. CLICK ON USERNAMES TO ASSIGN OR UNASSIGN AS NEEDED.

🔍 SEARCH TABLE ▽

2 SELECTED     ↻ REFRESH AS OF: FEB 10, 2023 3:12 PM ⚙

USER NAME ▲

| | |
|---|---|
| ☐ | USER1@EMAIL.COM |
| ☐ | USER2@EMAIL.COM |
| ☐ | USER3@EMAIL.COM |
| ☑ | USER4@EMAIL.COM |
| ☐ | USER5@EMAIL.COM |
| ☐ | USER6@EMAIL.COM |
| ☑ | USER7@EMAIL.COM |
| ☐ | USER8@EMAIL.COM |

8 RECORDS     SHOW RECORDS: 10⌄   1 - 8   ‹ ① ›

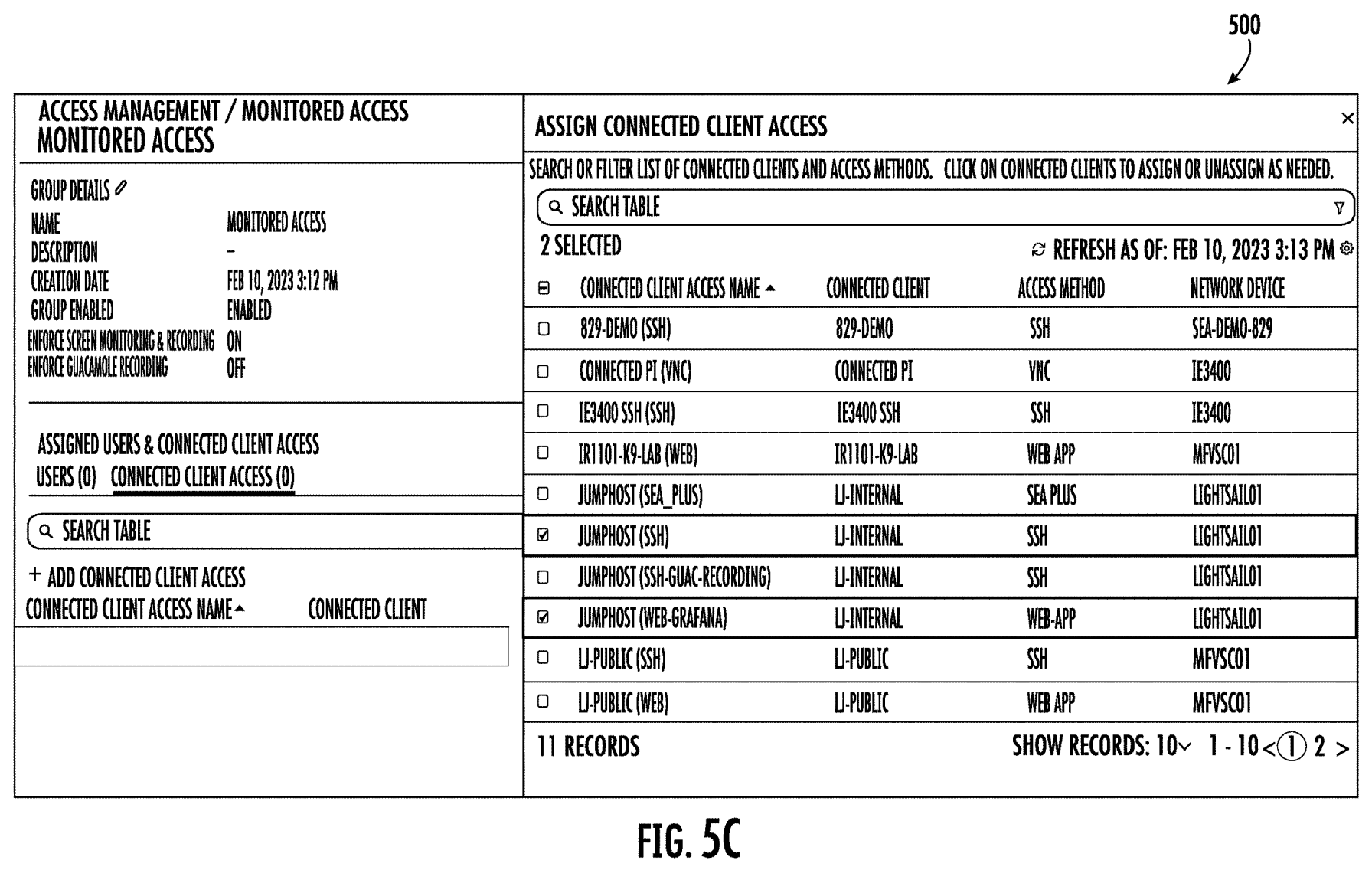

ACCESS MANAGEMENT / MONITORED ACCESS
MONITORED ACCESS

GROUP DETAILS ✎
NAME       MONITORED ACCESS
DESCRIPTION    -
CREATION DATE    FEB 10, 2023 3:12 PM
GROUP ENABLED    ENABLED
ENFORCE SCREEN MONITORING & RECORDING   ON
ENFORCE GUI/CONSOLE RECORDING   OFF

ASSIGNED USERS & CONNECTED CLIENT ACCESS
USERS (0)   CONNECTED CLIENT ACCESS (0)

🔍 SEARCH TABLE

+ ADD CONNECTED CLIENT ACCESS
CONNECTED CLIENT ACCESS NAME ▲       CONNECTED CLIENT

---

ASSIGN CONNECTED CLIENT ACCESS      ✕

SEARCH OR FILTER LIST OF CONNECTED CLIENTS AND ACCESS METHODS. CLICK ON CONNECTED CLIENTS TO ASSIGN OR UNASSIGN AS NEEDED.

🔍 SEARCH TABLE      ▽

2 SELECTED      ⟳ REFRESH AS OF: FEB 10, 2023 3:13 PM ⚙

| | CONNECTED CLIENT ACCESS NAME ▲ | CONNECTED CLIENT | ACCESS METHOD | NETWORK DEVICE |
|---|---|---|---|---|
| ⊟ | | | | |
| ☐ | 829-DEMO (SSH) | 829-DEMO | SSH | SEA-DEMO-829 |
| ☐ | CONNECTED PI (VNC) | CONNECTED PI | VNC | IE3400 |
| ☐ | IE3400 SSH (SSH) | IE3400 SSH | SSH | IE3400 |
| ☐ | IR1101-K9-LAB (WEB) | IR1101-K9-LAB | WEB APP | MFVSC01 |
| ☐ | JUMPHOST (SEA_PLUS) | LJ-INTERNAL | SEA PLUS | LIGHTSAIL01 |
| ☑ | JUMPHOST (SSH) | LJ-INTERNAL | SSH | LIGHTSAIL01 |
| ☐ | JUMPHOST (SSH-GUAC-RECORDING) | LJ-INTERNAL | SSH | LIGHTSAIL01 |
| ☑ | JUMPHOST (WEB-GRAFANA) | LJ-INTERNAL | WEB-APP | LIGHTSAIL01 |
| ☐ | LJ-PUBLIC (SSH) | LJ-PUBLIC | SSH | MFVSC01 |
| ☐ | LJ-PUBLIC (WEB) | LJ-PUBLIC | WEB APP | MFVSC01 |

11 RECORDS      SHOW RECORDS: 10∨   1 - 10 < ① 2 >

FIG. 5C

Figure 5D:
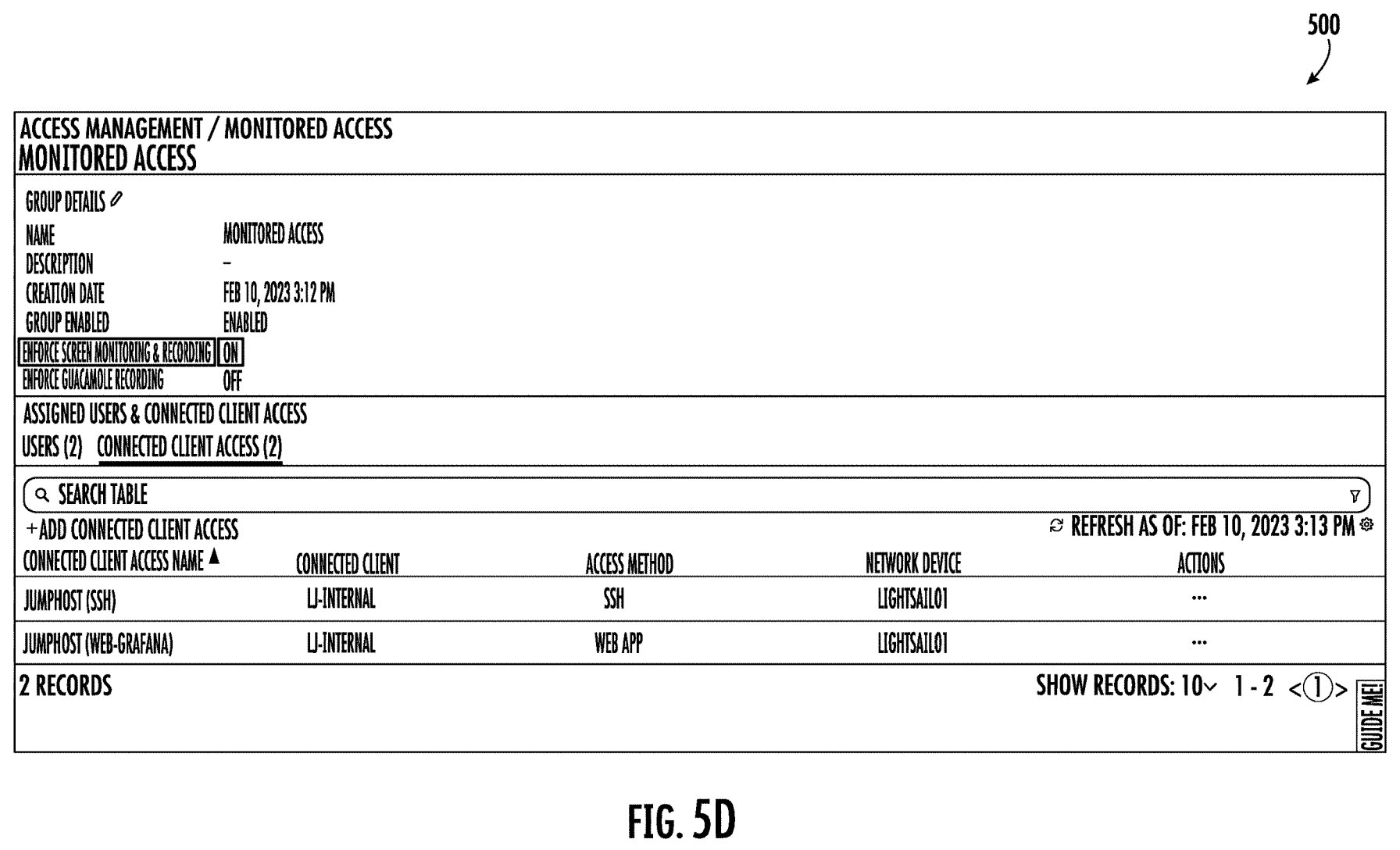

ACCESS MANAGEMENT / MONITORED ACCESS
MONITORED ACCESS

GROUP DETAILS ✎

NAME            MONITORED ACCESS
DESCRIPTION      –
CREATION DATE     FEB 10, 2023 3:12 PM
GROUP ENABLED     ENABLED
ENFORCE SCREEN MONITORING & RECORDING [ ON ]
ENFORCE GUACAMOLE RECORDING   OFF

ASSIGNED USERS & CONNECTED CLIENT ACCESS
USERS (2)    CONNECTED CLIENT ACCESS (2)

🔍 SEARCH TABLE

+ ADD CONNECTED CLIENT ACCESS                                  ↻ REFRESH AS OF: FEB 10, 2023 3:13 PM ⚙

| CONNECTED CLIENT ACCESS NAME ▲ | CONNECTED CLIENT | ACCESS METHOD | NETWORK DEVICE | ACTIONS |
|---|---|---|---|---|
| JUMPHOST (SSH) | LI-INTERNAL | SSH | LIGHTSAIL01 | ⋯ |
| JUMPHOST (WEB-GRAFANA) | LI-INTERNAL | WEB APP | LIGHTSAIL01 | ⋯ |

2 RECORDS                      SHOW RECORDS: 10∨   1 - 2   < ① >

GUIDE ME!

CHOOSE WHAT TO SHARE

RNIOTLABS2.CISCOIOTDEV.IO WANTS TO SHARE THE CONTENTS OF YOUR SCREEN.

CHROME TAB     WINDOW     ENTIRE SCREEN

CISCO IOT

CISCO IOT

SELECT A TAB TO PREVIEW

CANCEL     SHARE

600

CHOOSE WHAT TO SHARE
RNIOTLABS2.CISCOIOTDEV.IO WANTS TO SHARE THE CONTENTS OF YOUR SCREEN.

CHROME TAB          WINDOW          ENTIRE SCREEN

CISCO IOT          CISCO IOT          WEBEX

IOT LABS - DOCUMENTS....          INBOX

CANCEL          SHARE

600

YOU ARE RECORDING.  YOU MAY NOW MINIMIZE THIS WINDOW.

FIG. 6H

SECURE EQUIPMENT ACCESS WITH SCREEN MONITORING ENFORCEMENT

RELATED APPLICATION

This application claims priority to U.S. Prov. Appl. Ser. No. 63/470,551, filed Jun. 2, 2023, entitled SECURE EQUIPMENT ACCESS WITH SCREEN MONITORING ENFORCEMENT, by Hall-Zazueta, et al., the contents of which are incorporated herein by reference.

TECHNICAL FIELD

The present disclosure relates generally to computer networks, and, more particularly, to secure equipment access with screen monitoring enforcement.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another, such as an IoT motion sensor communicating with a smart lightbulb, to turn the lights on when a person enters a room. The IoT has also expanded to industrial settings as part of the so-called "Industrial IoT" (IIoT) to control manufacturing processes and other operations in industrial settings (e.g., factories, mines, oil rigs, etc.).

As devices are increasingly added to the IoT and IIoT, the number of external users and services that require access to them has also increased. For instance, a remote technician may wish to connect to a particular IoT/IIoT device so that they can perform maintenance on it (e.g., updating its firmware, running diagnostics, etc.). However, the very nature of the IoT/IIoT presents unique challenges that make traditional remote access approaches largely unsuitable. For instance, it is a common occurrence in industrial settings for endpoint devices to share the same Internet Protocol (IP) address, leading to cases in which a remote user needs to access multiple devices simultaneously that share the same IP address. In addition, the level of access actually needed by the remote user may be limited to a specific set of devices, protocol(s), port(s), time period, etc.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5D illustrate examples of a user interface from an admin portal perspective during setup of a group with enforced screen monitoring in a secure equipment access platform;

FIGS. 6A-6I illustrate examples of a user interface from a third-party user perspective during participation in an open remote access session with enforced screen monitoring in a secure equipment access platform;

DESCRIPTION OF EXAMPLE EMBODIMENTS

Overview

According to one or more embodiments of the disclosure, secure equipment access with screen monitoring enforcement is provided. In particular, embodiments of the techniques herein determine a remote access session from an accessing device to an accessed device, and also an access session screen-sharing security policy for the accessed device. The remote access session may then be prevented by the techniques herein in response to a violation of the access session screen-sharing security policy.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
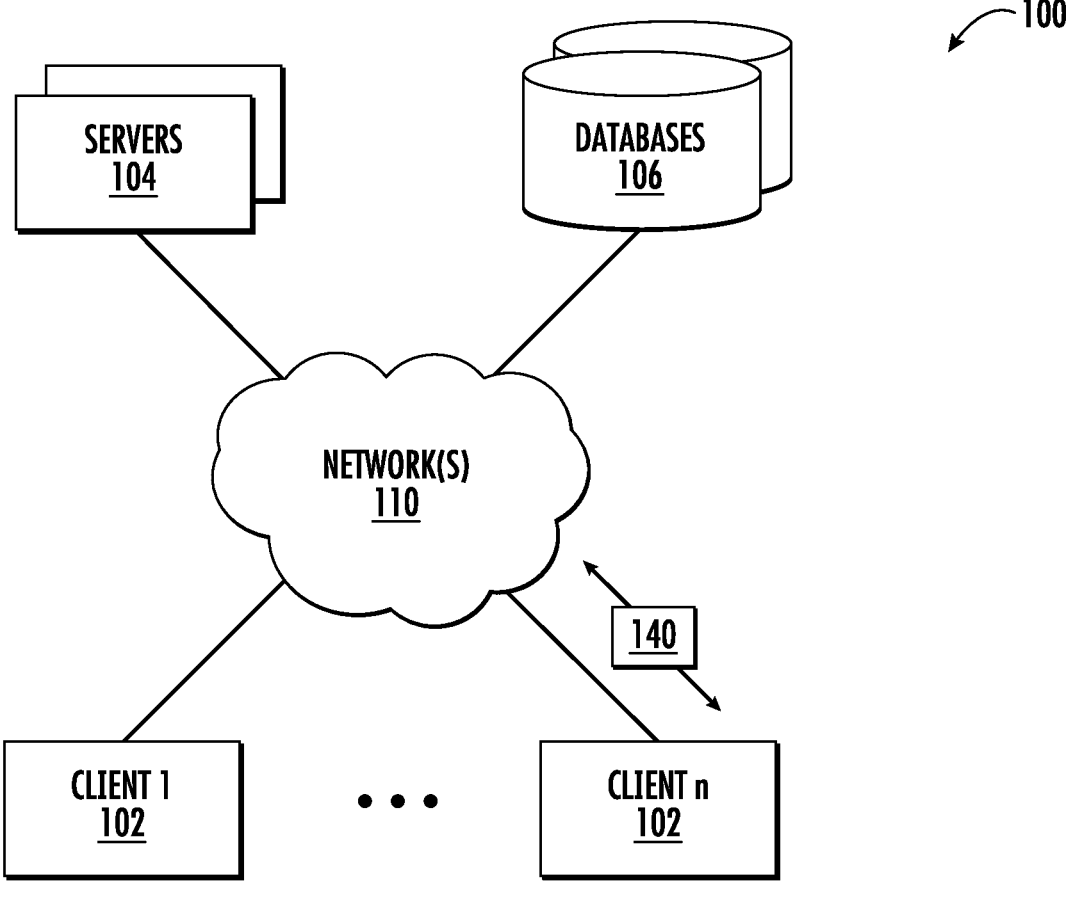
FIG. 1 illustrates an example communication network.

FIG. 1 is a schematic block diagram of an example simplified computing system (e.g., computing system 100) illustratively comprising any number of client devices (e.g., client devices 102) (e.g., a first through nth client device), one or more servers (e.g., servers 104), and one or more databases (e.g., database 106), where the devices may be in communication with one another via any number of networks. The one or more networks (e.g., network(s) 110) may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
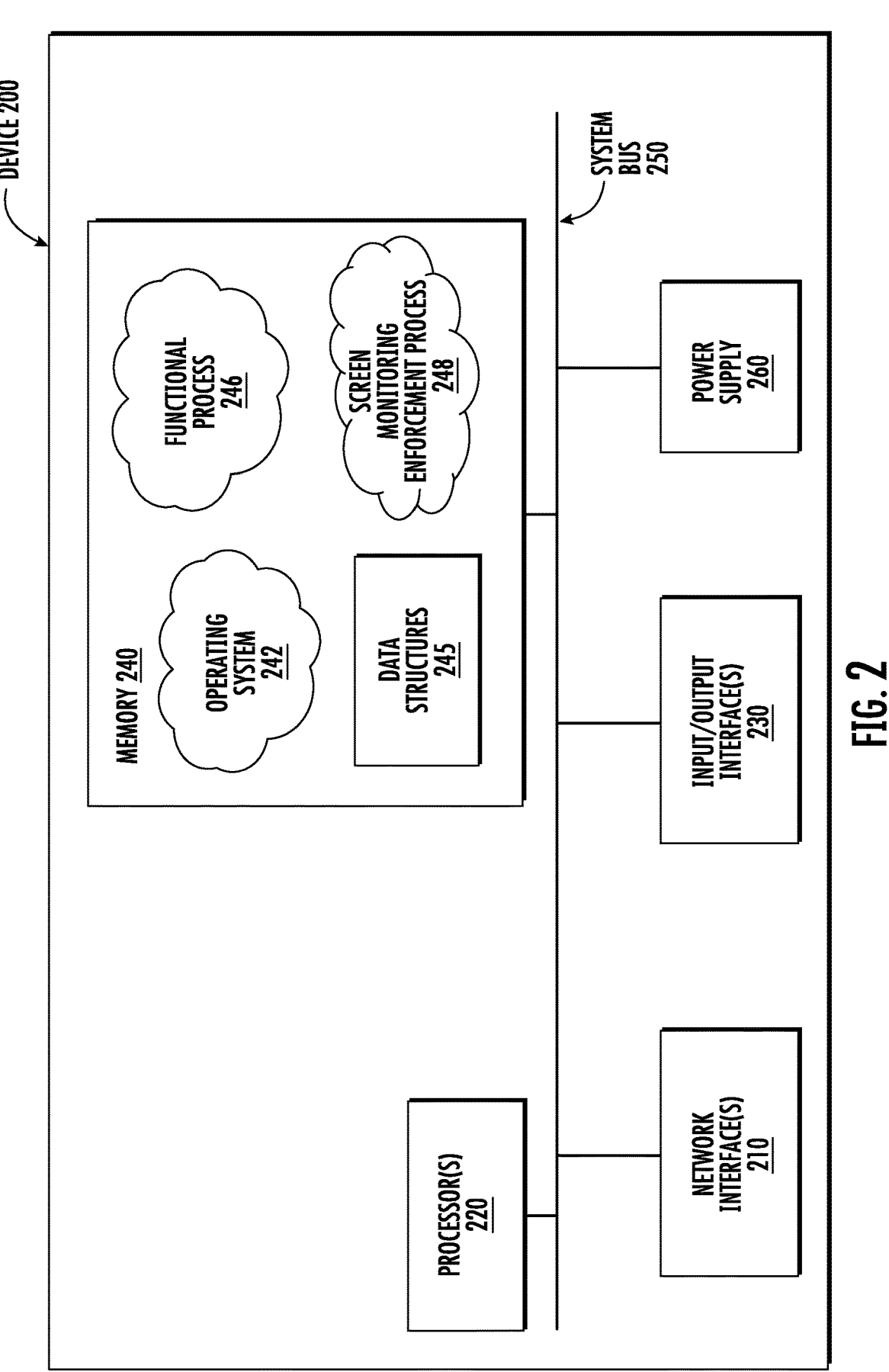
FIG. 2 illustrates an example network device/node.

FIG. 2 is a schematic block diagram of an example node/device 200 (e.g., an apparatus) that may be used with one or more embodiments described herein, e.g., as any of the devices 102-106 shown in FIG. 1 above. Device 200 may comprise one or more network interfaces (e.g., network interface(s) 210) (e.g., wired, wireless, etc.), at least one processor (e.g., processor 220), and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interface(s) 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interface(s) 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more of a functional process 246, and on certain devices, an illustrative screen monitoring enforcement process 248, as described herein. Notably, functional process 246, when executed by processor 220, cause each particular device (e.g., device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Secure Equipment Access with Screen Monitoring Enforcement—

As noted above, the Internet of Things (IoT) and Industrial IoT (IIoT) has increased the number of external users and services that require access to IoT/IIoT devices, such as for access, maintenance, monitoring, and so on. As also noted above, the very nature of the IoT/IIoT presents unique challenges that make traditional remote access approaches largely unsuitable. For instance, it is a common occurrence in industrial settings for endpoint devices to share the same Internet Protocol (IP) address, leading to cases in which a remote user needs to access multiple devices simultaneously that share the same IP address. In addition, the level of access actually needed by the remote user may be limited to a specific set of devices, protocol(s), port(s), time period, etc.

For security purposes, admins want the ability to monitor and record external users' remote access session activity. In some cases, this can be achieved on a session-by-session basis using the built-in monitoring capabilities of the remote access method (e.g., remote desktop gateways may provide session monitoring for SSH, RDP, and VNC remote access). However, not all remote access methods have built-in support for monitoring. Specifically, web-based remote access and network-based remote access currently require external monitoring/recording solutions.

Admins can request that third-party users share (for real-time monitoring) and/or record (for after-the-fact monitoring) their screen while accessing remote equipment. This can be accomplished with external software (e.g., Webex, etc.). However, admins have no way to enforce this request; third-party users might not start sharing/recording before initiating remote access sessions or might stop sharing/recording before closing their remote access sessions. Third-party users could also take advantage of external displays to circumvent a request to share their screen, or accidentally end screen sharing, prematurely, by closing the application which is controlling it. It does not make sense for admins to be present in real-time to monitor every remote access session which needs oversight. However, without being present, they currently have no way to ensure that third-party users' remote access activity is being properly captured.

In contrast, the techniques herein, therefore, facilitate admin enforcement of remote access policies for their managed devices (e.g., IoT devices). These techniques can be utilized to restrict remote sessions such that they are allowed only while the remote access policies are being observed. For example, the remote session may only be allowed while the third-party user accessing the device has screen sharing/recording active. This provides the ability to fully monitor and audit all user activity on remote sessions. That is, the techniques herein allow for the forced screen recording of remote access sessions to devices (e.g., IoT devices). In some aspects, the remote access session may be terminated if the user's device is not complying with the recording policy, such as only sharing a portion of their screen(s), etc.

Illustratively, the techniques described herein may be performed by hardware, software, and/or firmware, such as in accordance with the screen monitoring enforcement process 248, which may include computer executable instructions executed by the processor 220 to perform functions relating to the techniques described herein, e.g., in conjunction with other processes on the same device or other collaborative devices, accordingly.

Figure 3:
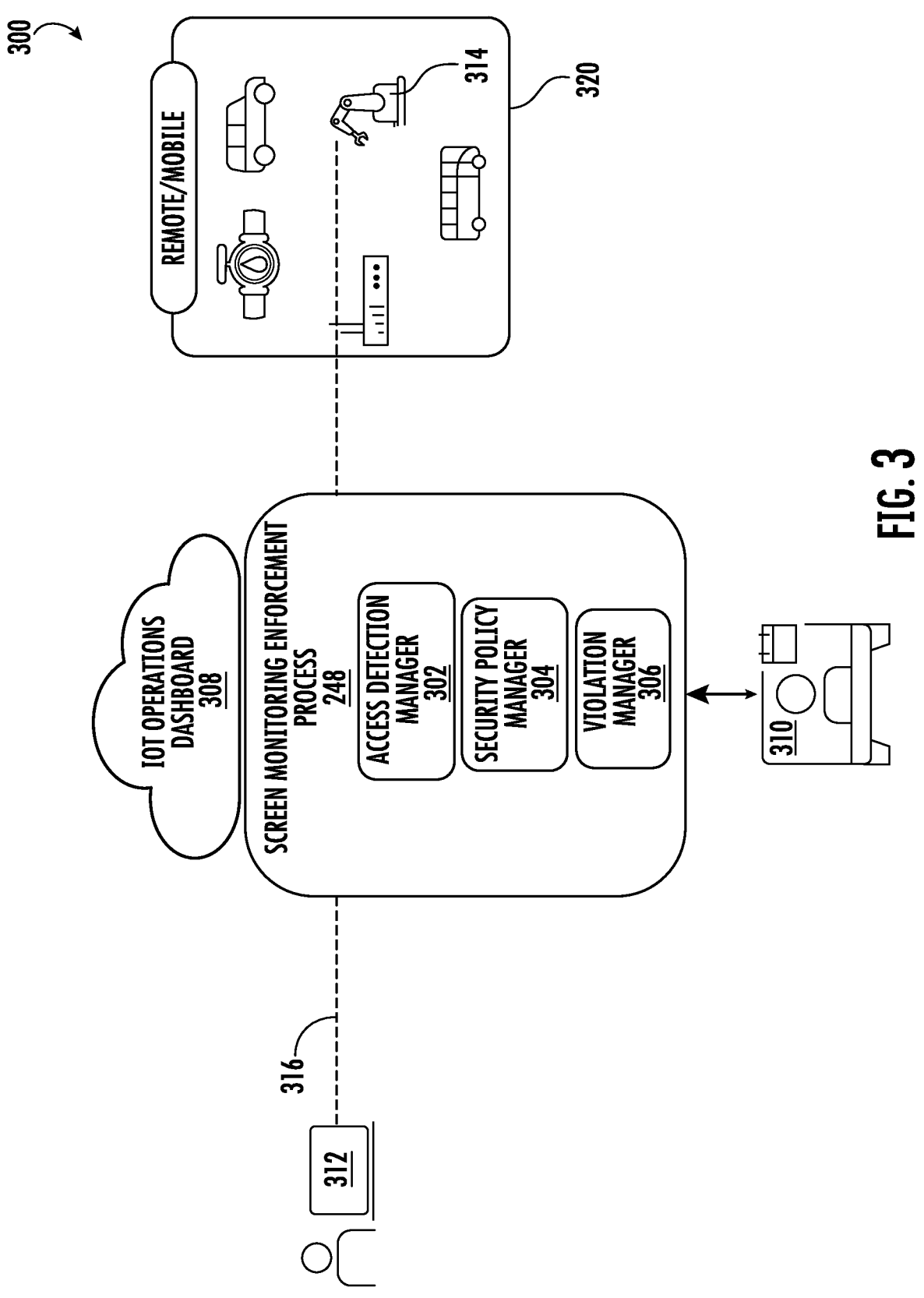
FIG. 3 illustrates an example of an architecture for secure equipment access.

Operationally, FIG. 3 illustrates an example of an architecture 300 for secure equipment access. At the core of architecture 300 is screen monitoring enforcement process 248, which may be executed by one or more device. For example, screen monitoring enforcement process 248 may be executed by a network controller, an edge device, an IoT device, an IoT controller, an equipment controller, a computing device, a server, cloud computing resources, etc. Of course, all or parts of the screen monitoring enforcement process may be executed by any device communicatively coupled to an accessing device, an accessed device, and/or a data communication network therebetween. In various embodiments, screen monitoring enforcement process 248 may be executed as a part of and/or in association with a secure equipment access platform (e.g., that manages remotely connected assets providing flexible access for remote configuration and maintenance of industrial assets in distributed locations while managing security risks) and/or an IoT operations dashboard 308 which may be delivered as a cloud service.

As shown, screen monitoring enforcement process 248 may include access detection manager 302, security policy manager 304, and/or violation manager 306. As would be appreciated, the functionalities of these components may be combined or omitted, as desired. In addition, these components may be implemented on a singular device or in a distributed manner, in which case the combination of executing device can be viewed as their own singular device for purposes of executing screen monitoring enforcement process 248.

When executing, screen monitoring enforcement process 248 may facilitate an admin 310 in providing controlled access to assets in a manner that complies with security policies. For instance, an admin 310 may utilize screen monitoring enforcement process 248 to ensure that a remote access session 316 between an accessing device 312 (e.g., controlled by an internal employee, a third-party remote worker from an external vendor, etc.) and an accessed device 314 (e.g., an industrial asset, an IoT/IIoT device, automated sensors, automated equipment, etc.) is always in compliance with a security policy for the accessed device 314.

When executing, access detection manager 302 may detect a remote access session 316 from an accessing device 312 to an accessed device 314. For example, access detection manager 302 may detect when an accessing device 312 is attempting to initiate a remote access session 316 to an accessed device 314. This may be accomplished by monitoring remote access session requests to managed assets.

When executing, security policy manager 304 may determine an access session screen-sharing security policy for the accessed device 314. The screen-sharing policies may be determined from the accessed device 314, a controller, a centralized repository, a tag or setting associated with a managed group of assets, etc. The screen-sharing policies may include security requirements for establishing, maintaining, and/or terminating the remote access session 316 being initiated.

For example, a screen-sharing policy may include a requirement such as requiring full-screen sharing and/or recording (e.g., before the remote access session 316 is opened and/or for as long as the remote access session 316 remains open). A screen-sharing policy may include a requirement limiting the amount (e.g., to one, to the number able to be simultaneously shared, etc.) of displays allowed to be connected to the accessing device 312 before and/or during the remote access session 316. Essentially, screen-sharing policies may specify, for an accessed device 314, the permissible configurations, settings, actions, application activity to be observed by the accessing device 312 in order to initiate and/or maintain remote access session 316 to the accessed device 314.

It should be appreciated that each specific policy may not always be an individual assignment to a particular accessed device. For example, one or more of the policies may be assigned to and/or associated with a group of managed assets 320 to which the accessed device 314 belongs. In addition, multiple policies may be simultaneously designated to the group of managed assets 320 and/or to the accessed device 314 and/or implicated by a more generic setting (e.g., toggling on an "enforce monitoring and recording" setting for the group of managed assets 320 and/or the accessed device 314).

When executing, violation manager 306 may enforce the screen-sharing security policies for the accessed device 314. This may include monitoring the configurations, settings, actions, application activity, etc. of the accessing device 312 as they relate to the remote access session 316 before, during, and/or after the remote access session 316. These monitored elements may be compared against applicable screen-sharing security policy to detect violations. If a violation of the access session screen-sharing security policy is detected by violation manager 306, it may prevent the remote access session 316 (e.g., prevent initiation, prevent continuation, automatically terminate, etc.).

For example, to meet a security requirement of an admin 310, full-screen-sharing (real-time and/or recorded) by the accessing device 312 may be required to be enforced for every remote access session. If the full screen is not shared, auditing could miss actions taken in non-browser-based access sessions. If sharing is not enforced before any remote access session is opened and for as long as the remote access session 316 remains open, a user of the accessing device 312 could still take actions on remote equipment (e.g., accessed device 314) while un-monitored.

Typically, screen-sharing should be discontinued after a third-party user (accessing device 312) wants to end it (e.g., terminates the remote access session 316, etc.). In order to ensure that the entirety of remote access sessions is monitored, violation manager 306 may be executed to automatically end all remote access sessions when screen-sharing is ended as soon as possible.

Screen-sharing requirements may not be tied or limited to any particular remote access session. Instead, they may be applied to control all sessions for a particular group of assets (e.g., managed by an admin 310). As a result, the example screen-sharing requirement may not be tied to a specific remote access session, but rather violation manager 306 may prevent third-party users from opening any remote access session until they have initiated screen-sharing/recording.

In some examples, screen-sharing may be restricted to sharing one display at a time. In such examples, admin 310 may not be able to surveil actions taken on an additional screen of an accessing device 312. As such, violation manager 306 may prevent a third-party user (e.g., accessing device 312) from initiating screen-sharing unless they have only one display connected.

In addition, violation manager 306 may also account for the ways that the third-party user (e.g., accessing device 312) could (accidentally or intentionally) end sharing/recording prematurely or interfere with screen-sharing/recording. For example, sharing/recording may be ended or obscured prematurely by quitting or force-quitting the application which initiated screen-sharing/recording (or the application crashing). Further, sharing/recording may be ended or obscured prematurely by closing the specific window which initiated screen-sharing/recording. Furthermore, sharing/recording may be ended or obscured prematurely by stopping screen-sharing/recording from the application which initiated screen-sharing (as opposed to from a UI of the IoT operations dashboard 308 and/or secure equipment access system). Moreover, sharing/recording may be ended or obscured prematurely by adding an external display while sharing/recording is active (which might be used to circumvent screen-sharing).

Any of these actions/events may be detected by violation manager 306. As a result, violation manager 306 may recognize the corresponding violation of the screen-sharing security policy and cause remote access session 316, and potentially all or some of their other remote access sessions, to be automatically and/or immediately ended.

This detection and enforcement by violation manager 306 may be accomplished by any of various different methodologies. For example, the presence or addition of external displays may be detected utilizing browser APIs (e.g., Chrome's Multi-Screen Window Placement API, etc.). Further, the application which initiates sharing/recording may be configured to determine if it is used to stop sharing/recording and relay this information to a backend which then ends all remote access sessions started during that monitoring-session. Furthermore, violation manager 306 may cause periodic validations of the status of sharing/recording with the sharing/recording application itself, to make sure that the user's screen (e.g., accessing device 312) is being properly captured.

Moreover, unexpected end-monitoring events (such as the sharing/recording application being quit) may not necessarily be caught as they occur. In order to prevent users (e.g., accessing device 312) from taking un-monitored actions after an uncaught end-monitoring event, violation manager 306 may independently track whether monitoring is active. For instance, violation manager 306 may cause a keepalive message from the sharing/recording application to be utilized to confirm that the monitoring is still active. In various embodiments, this may include causing a keepalive message to be periodically sent to the backend while sharing/recording is active. Then, if that message fails to arrive for a set period of time (e.g., 3 seconds, etc.), the backend may automatically and/or immediately end all remote access sessions started during that monitoring-session.

Figure 4:
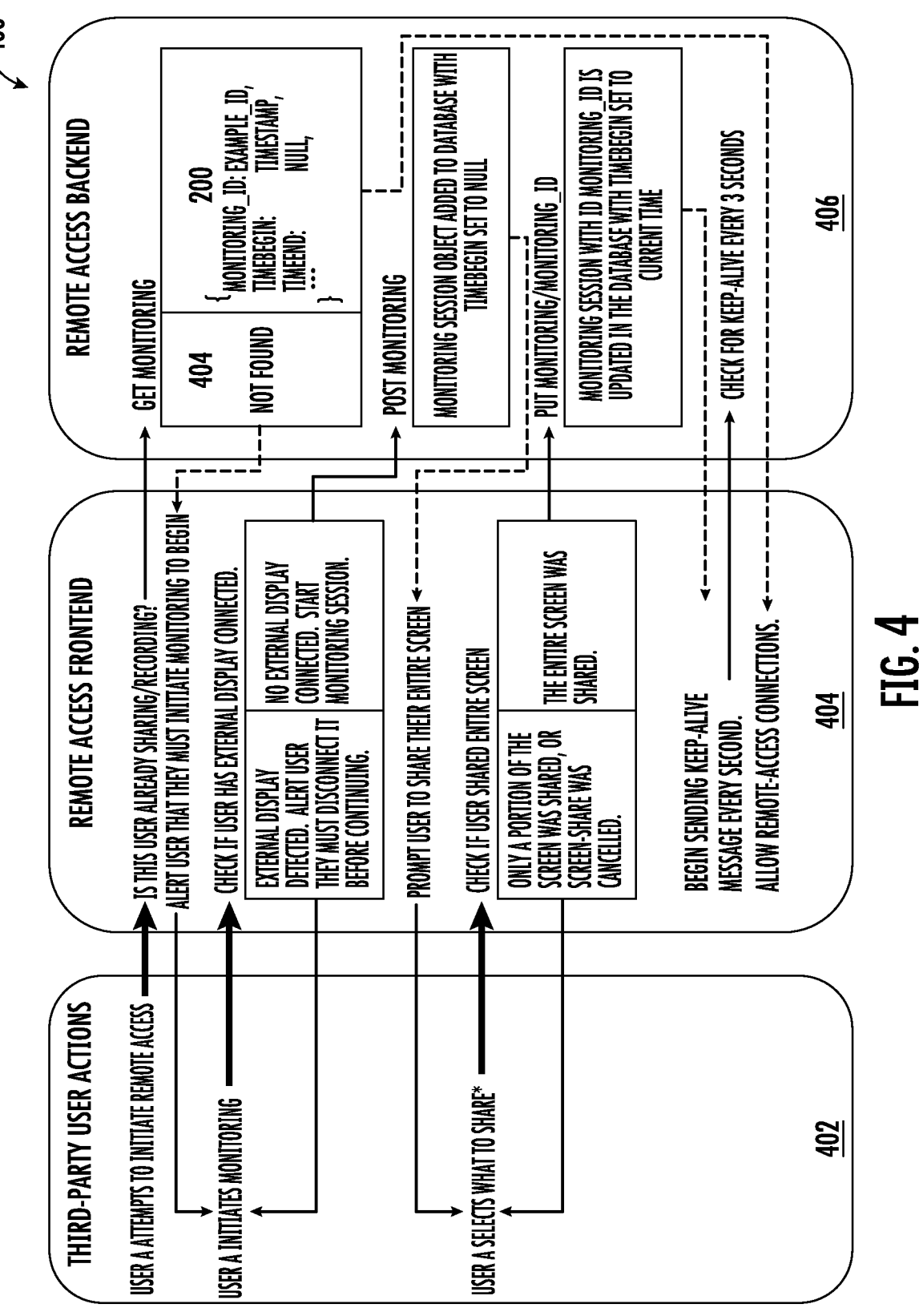
FIG. 4 illustrates an example of a process flow for secure equipment access with screen monitoring enforcement.

FIG. 4 illustrates an example of a process flow 400 for secure equipment access with screen monitoring enforcement, in accordance with one or more embodiments described herein. Specifically, process flow 400 illustrates an example of steering logic for security policy enforcement in remote access sessions within a secure equipment access platform (e.g., which may be a component of an IoT operations dashboard) through the context of third-party user actions 402 processed via a remote access frontend 404 and/or remote access backend 406.

For example, in process flow 400 a user attempts to initiate a remote access session. A determination is made whether the user is already sharing/recording (e.g., monitoring has already been initiated). If so, the remote access connection being requested may be allowed and/or the process flow 400 may be allowed to progress to the subsequent checks (e.g., external display check, entire screen sharing check, etc.) with respect to processing the requested remote access connection.

Alternatively, if a determination is made that the sharing/recording has not been initiated, then the user may be alerted that they must initiate such monitoring in order for the requested remote access connection to be allowed. When the user initiates monitoring, process flow 400 may proceed to an external display check. Here, if an external display (e.g., a display in addition to the display being monitored or capable of being monitored) is detected then an alert may be sent to the user warning them that they must disconnect the external display in order for the requested remote access connection to be allowed. Alternatively, if a determination is made that no external display is connected then a monitoring session may be initiated. In various embodiments, this may include a monitoring session object being added to a database with timeBegin set to null.

Then, the user may be prompted to share their entire screen. The user may select what of their screen to share and process flow 400 may proceed to a check of whether the entire screen is, in fact, being shared. If it is determined that only a portion of the screen is shared or that the screen share has been canceled, then the user may be prompted that their entire screen must be shared in order for the requested remote access connection to be allowed. Alternatively, if it is determined that the entire screen is being shared, then a monitoring session with id monitoring_id may be updated in the database with timeBegin set to current time.

In various embodiments, continuous monitoring of whether the monitoring session remains active may be initiated. For example, a keepalive signal may be initiated such that remote access frontend 404 periodically communicates a keepalive message to remote access backend 406 according to a schedule (e.g., every three seconds). As such, remote access backend 406 may check for the keepalive message according to the schedule. If the keepalive message is not received according to the schedule, then the remote access connection may be terminated.

A demonstration of a working model showing an enforced monitoring flow from an admin and third-party user perspective can be found in FIG. 5A through FIG. 8.

For instance, FIGS. 5A-5D illustrate examples of a user interface 500 from an admin portal perspective while being used to setup a group with enforced screen monitoring and/or recording in a secure equipment access platform.

In FIG. 5A, the user interface 500 is used to set up a group with enforced screen monitoring. A group name may be assigned and a description may be provided by the admin. An option for enforcing screen monitoring and recording for the group may be selected (e.g., toggled on) causing the group to be classified accordingly. The group may then be added to the list of managed groups where it will then be visible going forward.

In FIG. 5B, the user interface 500 is then used by the admin to enter an "edit group" page. Here, the admin may assign or unassign users to the group. These assignments may designate those users that are granted permissions to access the managed assets according to the screen-sharing security policies.

In FIG. 5C, the user interface 500 is used by the admin to add connected client access methods to the group. The connected clients may be clients that are subject to the screen-sharing security policies, and which may be accessed by the designated users.

In FIG. 5D, the user interface 500 illustrates the resulting saved group and group details from the selections made in FIGS. 5A-5C.

FIGS. 6A-6I illustrate examples of a user interface 600 from a third-party user perspective while attempting to participate in an open remote access session with enforced screen monitoring and/or recording in a secure equipment access platform. The third-party user may be one of the users assigned to the group (e.g., in FIG. 5B) and the open session may be subject to the settings of that group.

Figure 6A:
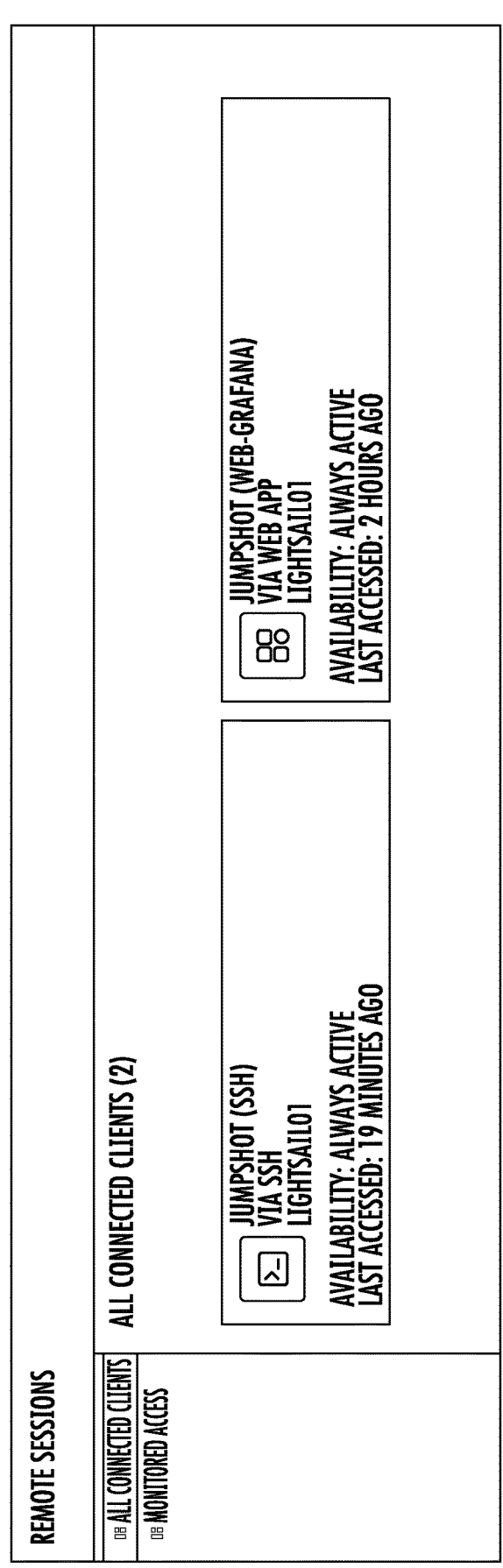

In FIG. 6A, the third-party user attempts to utilize user interface 600 to open a session with one of the designated client connection methods. Here, the third-party user is only in the monitored group.

Figure 6B:
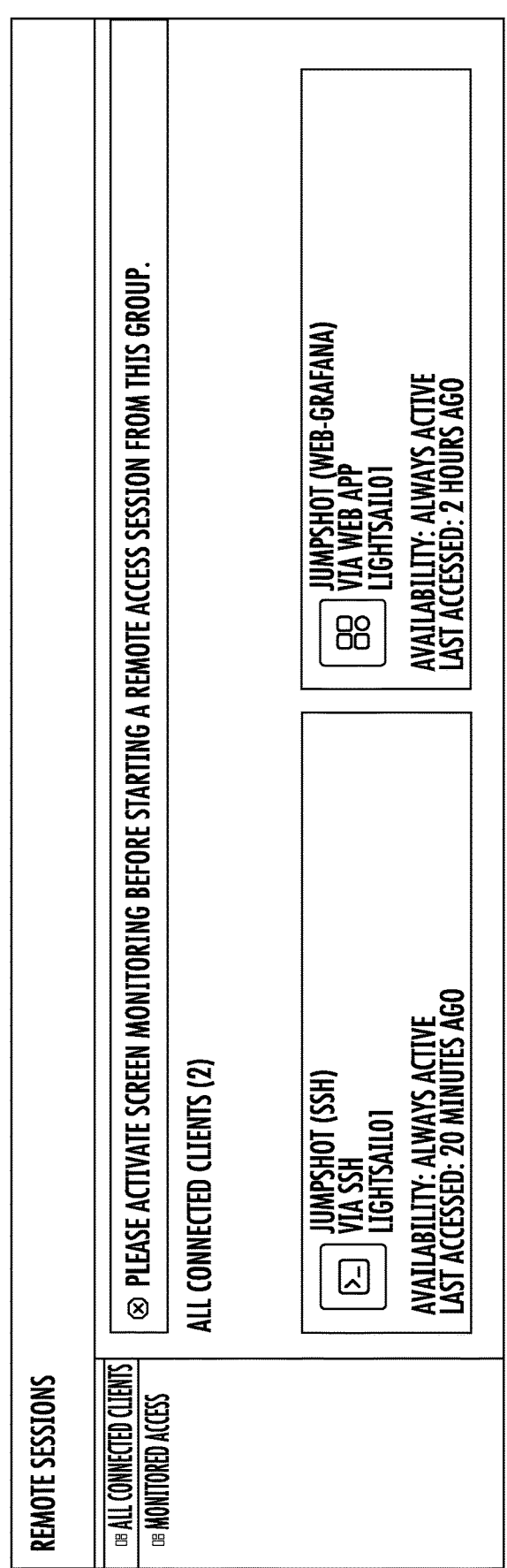

In FIG. 6B, since the third-party user is only in the monitored group, the user interface 600 informs the third-party user of the necessity of having screen monitoring active before the remote access session can be established.

Figure 6C:
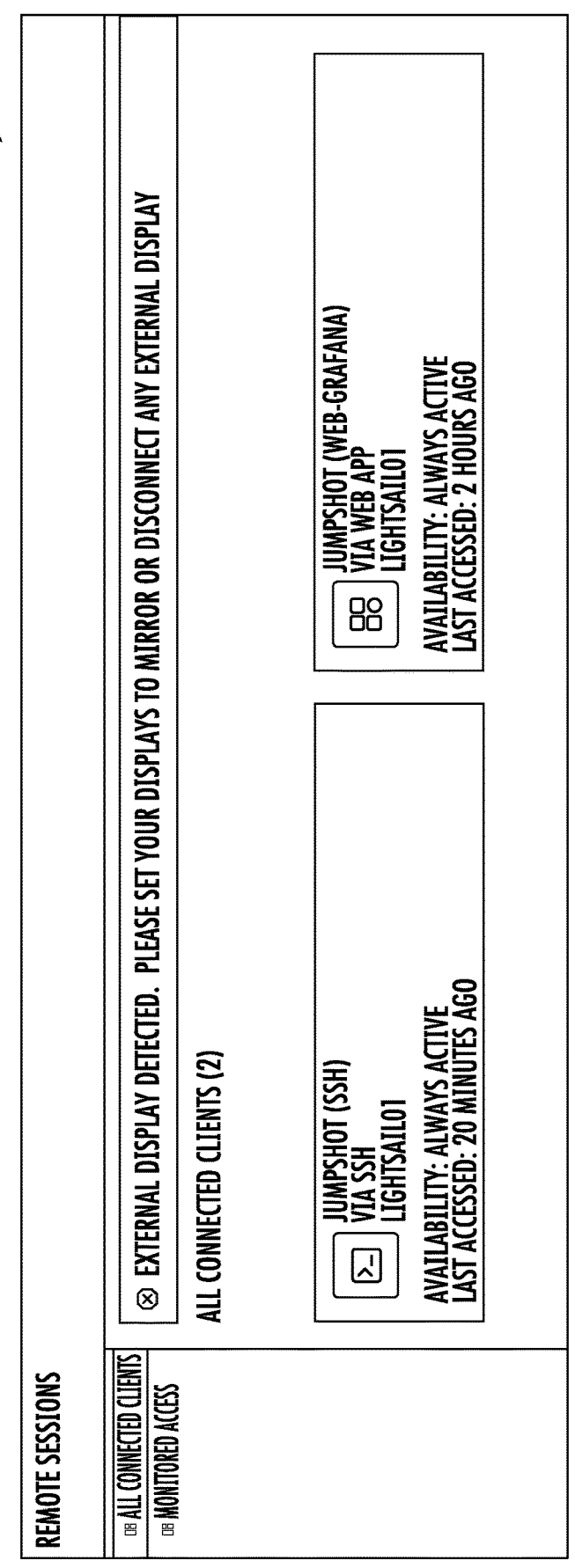

In FIG. 6C, once the user has activated screen monitoring an external display (e.g., one or more display that is unable to be monitored simultaneous with the remote access session) has been detected as being connected to the third-party user's device. As such, user interface 600 informs that user of the external display detection and/or that the external displays must be set to mirror a monitored display or that the external display must be disconnected from the third-party user's device before the remote access session can be established. After disconnecting the monitor, since the system is still enforcing the recording policies herein, when the user selects the session, the system will go through the process to initiate the recording and may remind the user to share the entire screen.

Figure 6D:
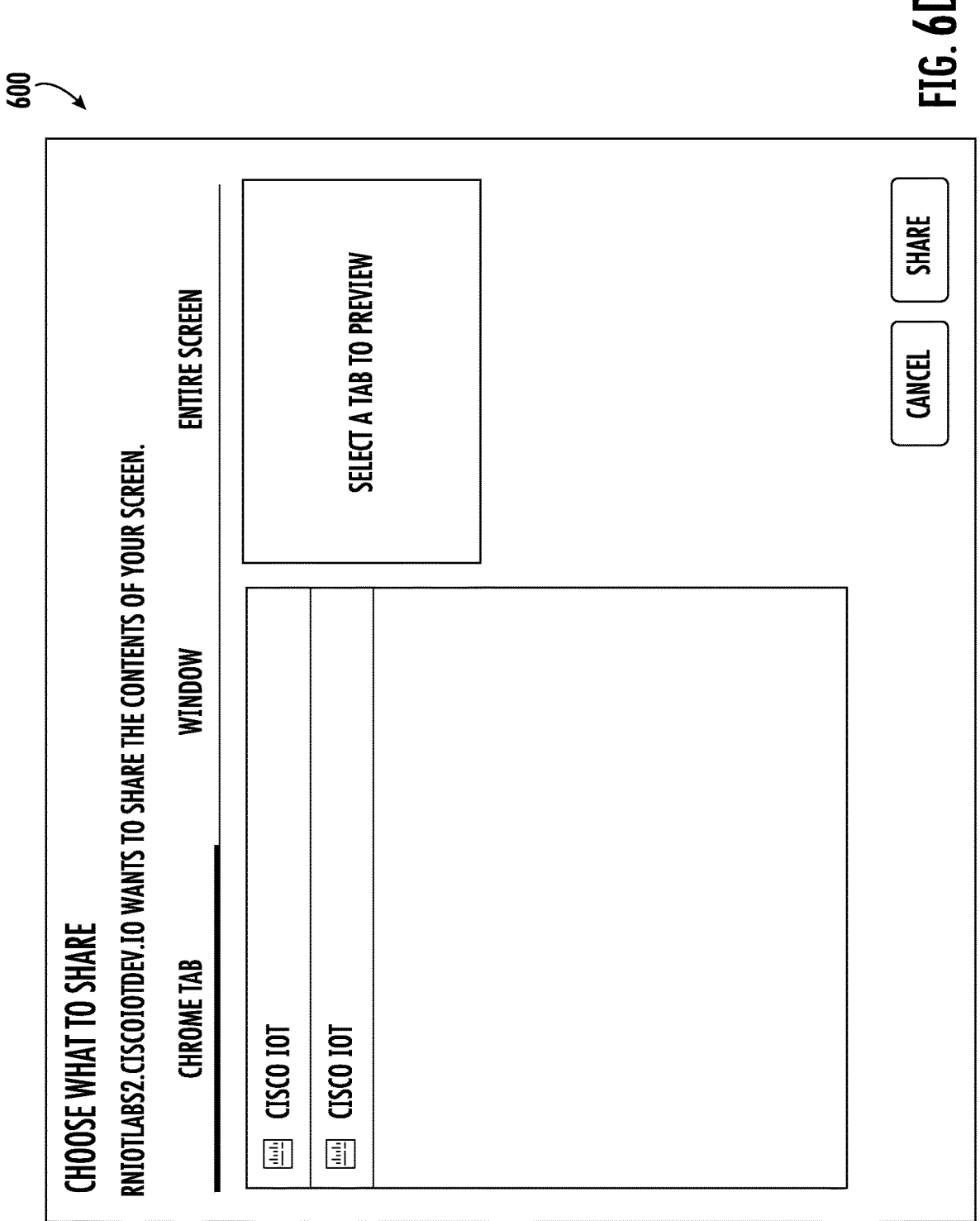
Figure 6E:
Figure 6F:
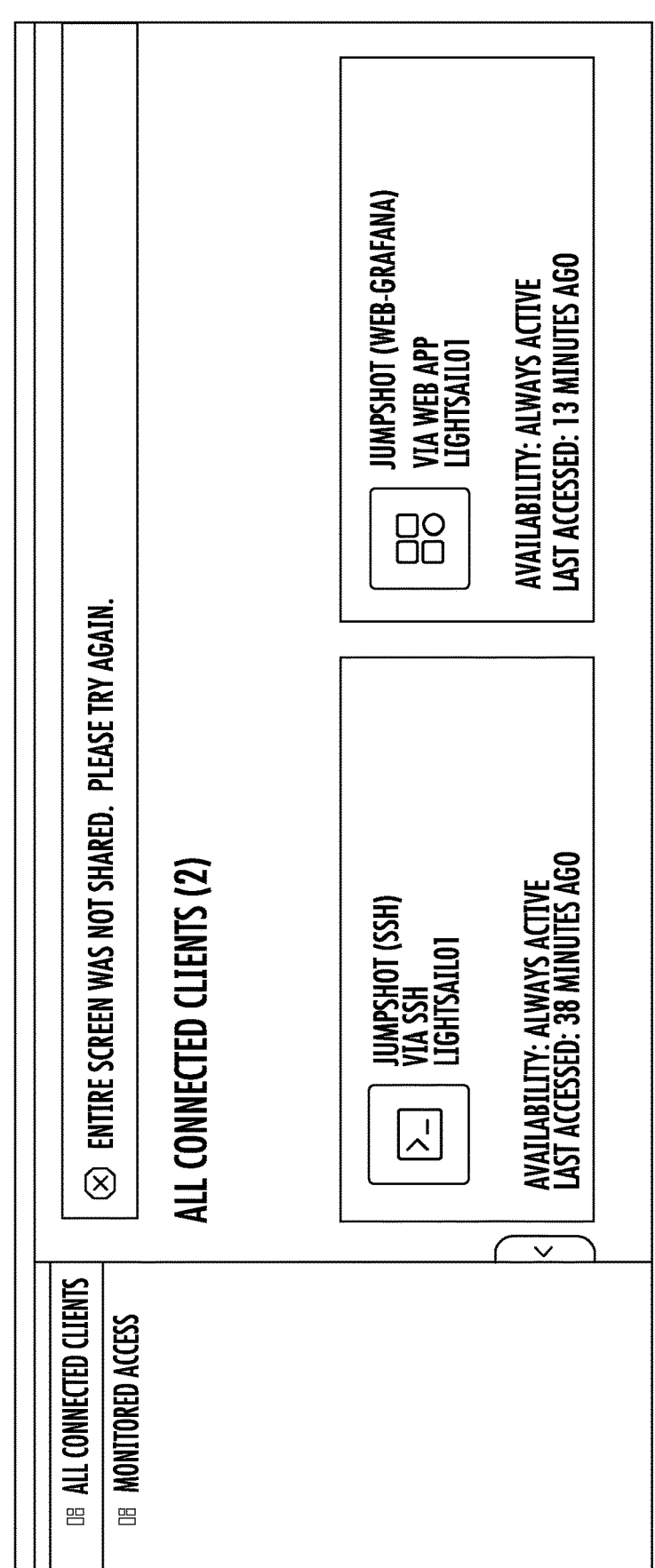

That is, as shown in FIG. 6D, a user may be presented with the standard options to share browser tabs via user interface 600, or else may select particular windows via user interface 600 as shown in FIG. 6E. Since the system herein enforces that the user has to share the entire screen, if they do not do so, then they are informed via user interface 600 that the selection will not work, as shown in FIG. 6F (otherwise it cannot be ensured that all of the session activity is being recorded).

Figure 6G:
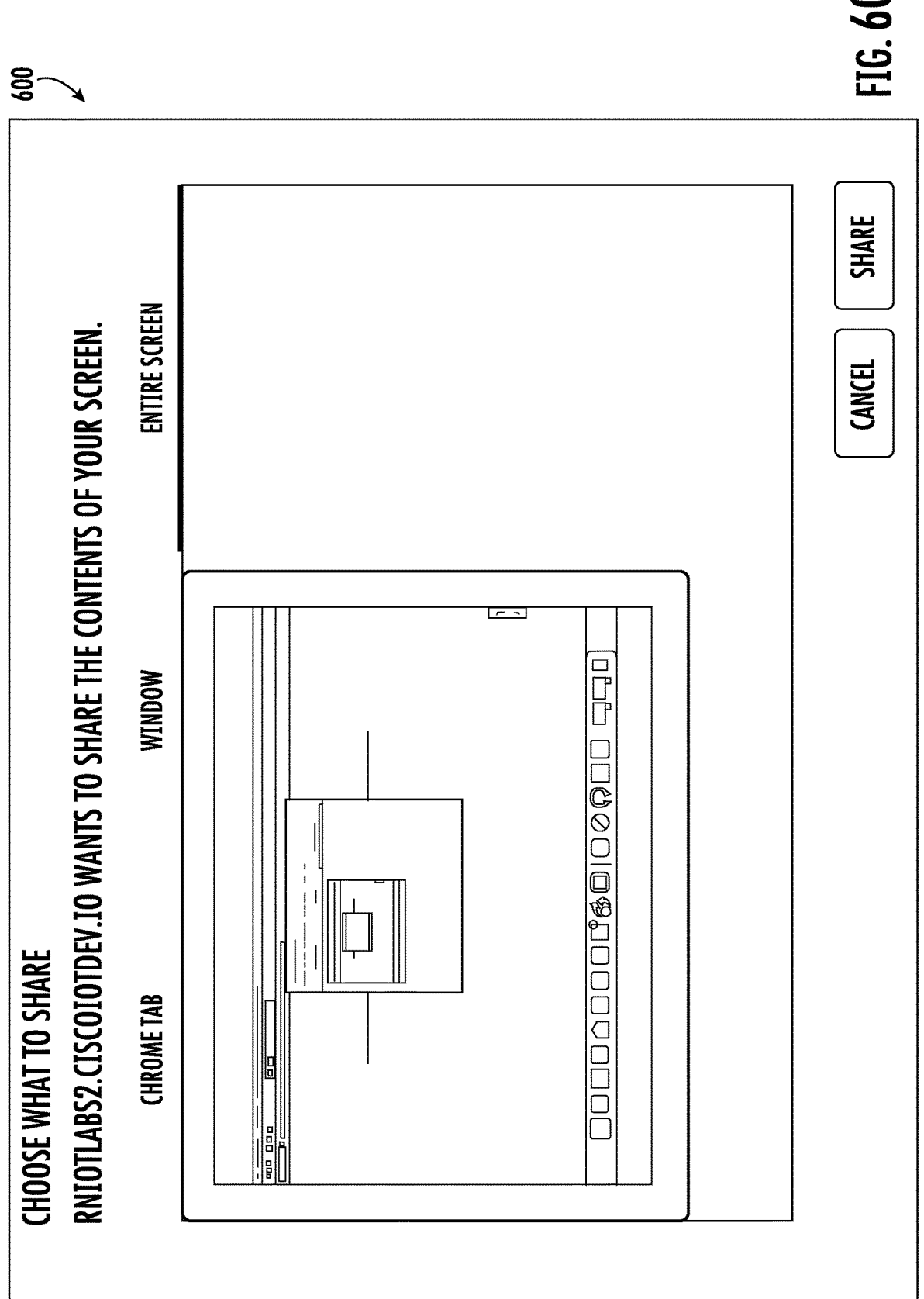
Figure 6H:
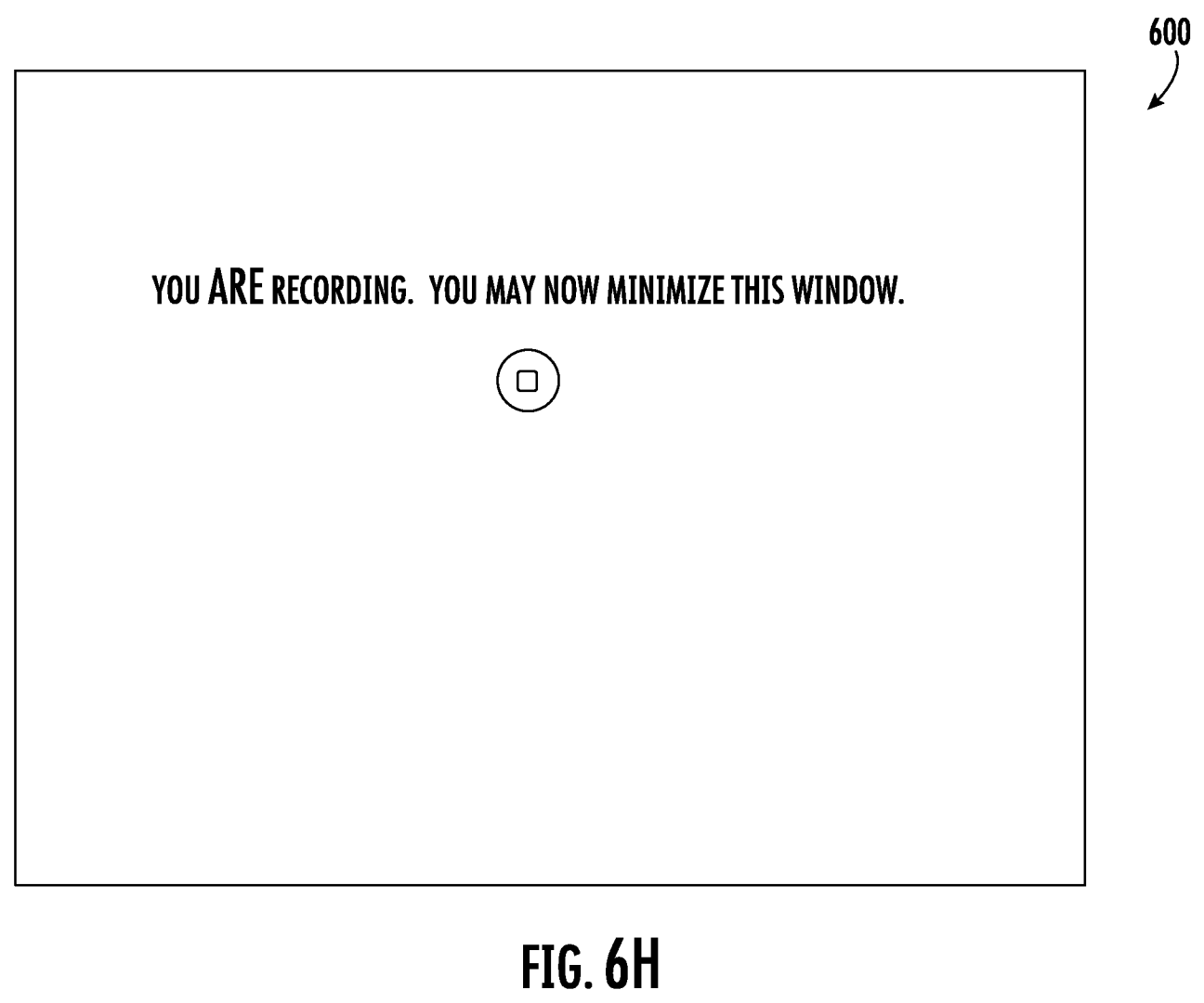

Now, as shown in FIG. 6G, if the user successfully shares the entire screen (i.e., when the browser dialog pops up, the user selects to share everything) via user interface 600, then in FIG. 6H user interface 600 shows that the recording has initiated.

Figure 6I:
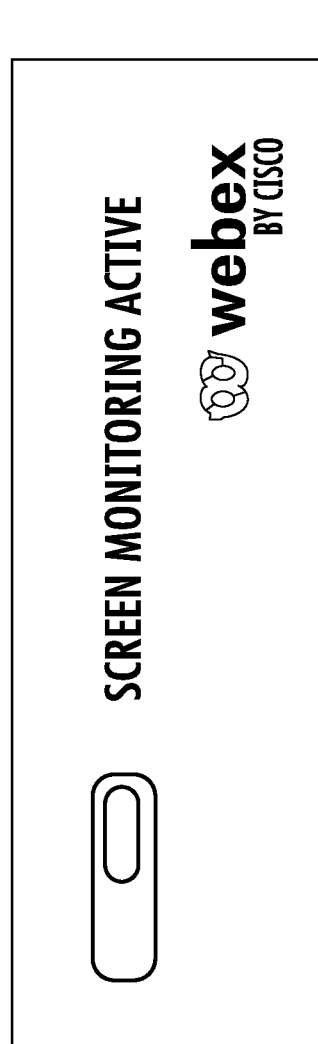

Then, as illustrated in FIG. 6I an icon or other indicator may appear on user interface 600 to show that screen monitoring is active. For example, this icon may appear in the IoT operations dashboard to indicated that the secure monitoring is active and the remote access session may be started.

Figure 7A:
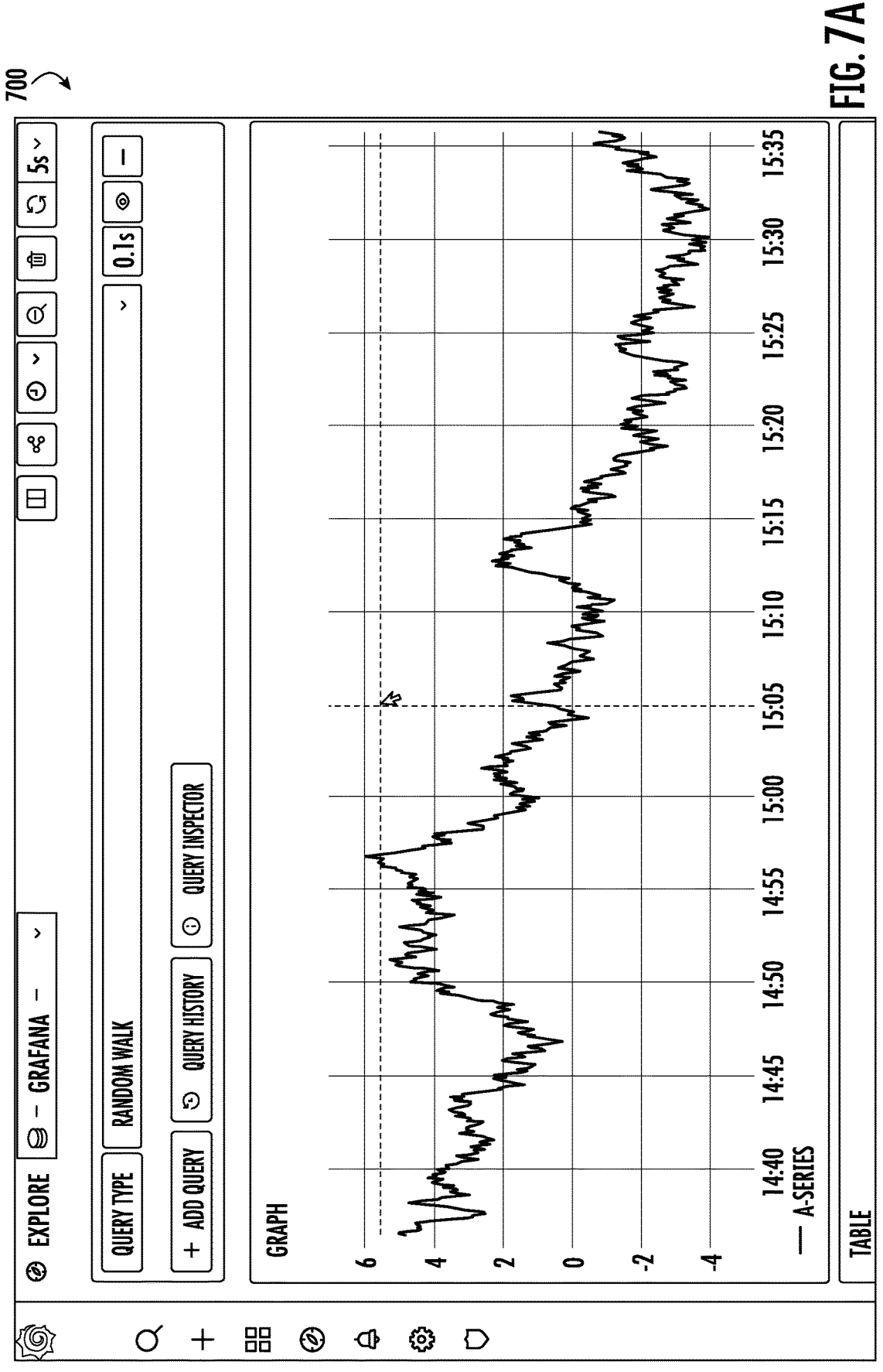
FIGS. 7A-7B illustrate examples of a user interface from an admin portal perspective during screen monitoring enforcement in a secure equipment access platform.
Figure 7B:
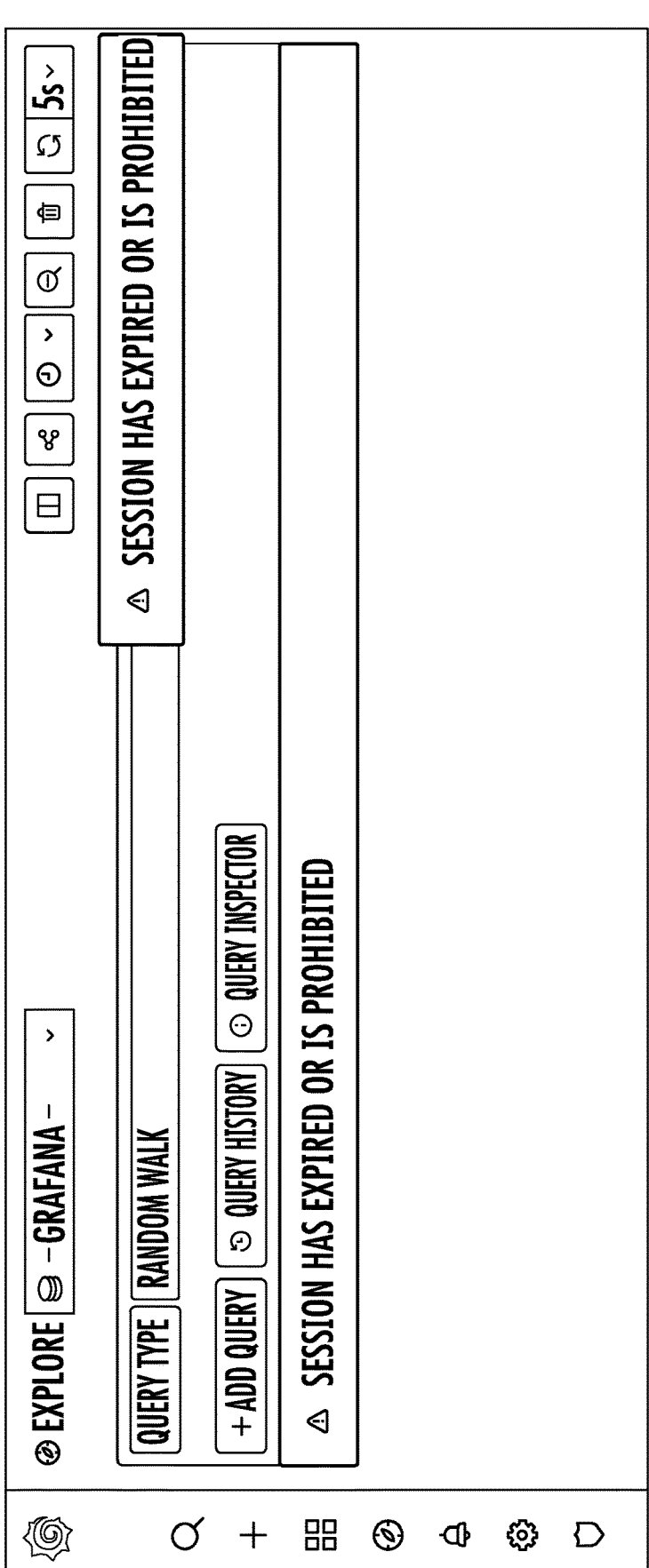

FIGS. 7A-7B illustrate examples of a user interface 700 from an admin portal perspective while screen monitoring enforcement is being conducted in a secure equipment access platform.

Referring now to FIG. 7A, an admin can now log into the remote access session and set up a keepalive connection loop where an active session request is issued according to a schedule (e.g., every five seconds). The admin may monitor the successful user request data for the remote access session via user interface 700. The user interface 700 may include a graphical representation of successful user requests that is persistently updated through the remote access session according to the schedule.

However, if the user decides to shut off monitoring, or accidentally takes an action to shut off monitoring, as described above the keepalive connection will fail. In such instances, the active session requests from the remote access session will start to fail (i.e., even though requests may still be made, the keepalive fail shows that monitoring is no longer active, and therefore the system cannot actually make those requests). Therefore, the remote access session may be automatically disconnected and a notification via user interface 700 may inform the admin that the remote access session has expired or is prohibited as illustrated in FIG. 7B.

Figure 8:
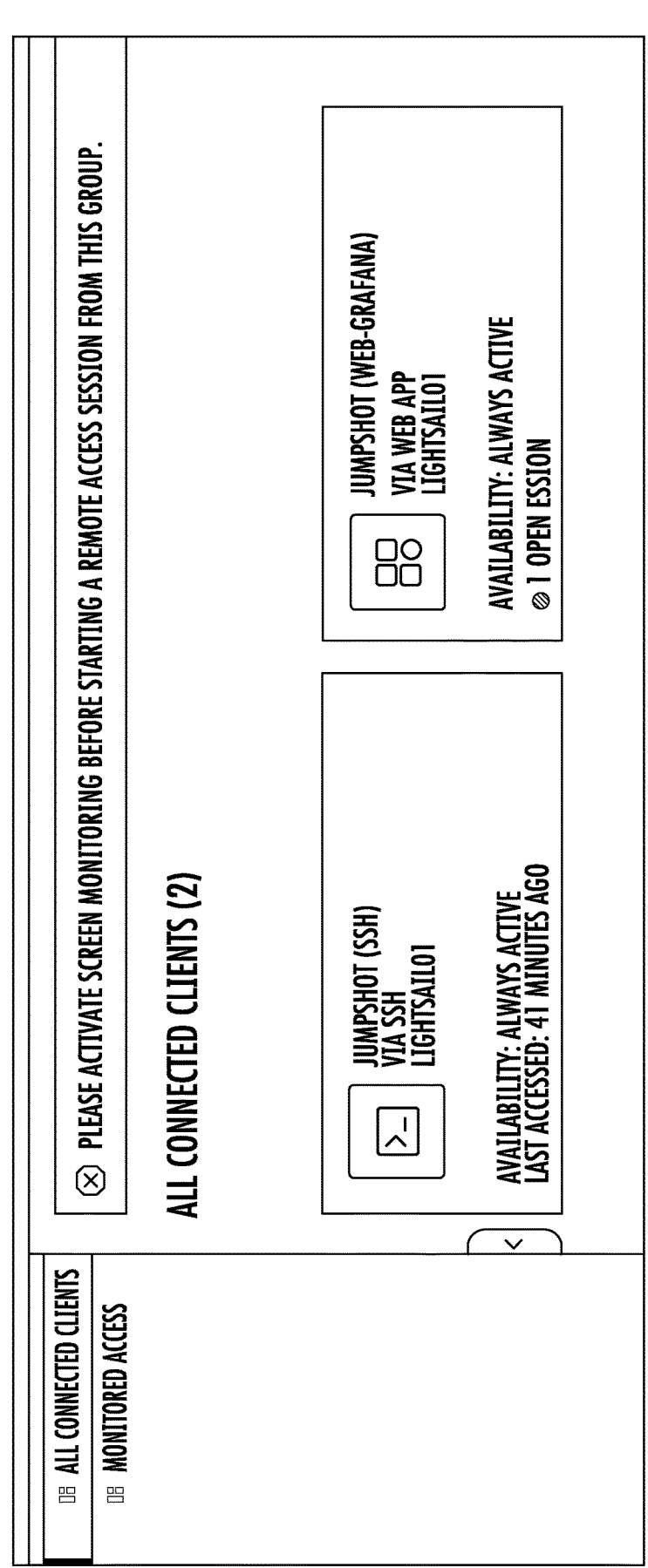
FIG. 8 illustrates an example of a user interface from a third-party user perspective during initiation of a remote access session with enforced screen monitoring in a secure equipment access platform.

FIG. 8 illustrates an example of a user interface 800 from a third-party user perspective while attempting to initiate a remote access session with enforced screen monitoring and/or recording in a secure equipment access platform. When the third-party user then again tries to reinitiate a session or start a new session, they may also have to start a new monitoring session, accordingly. Therefore, user interface 800 may again inform the third-party user of the necessity of having screen monitoring active before the remote access session can be established.

Figure 9:
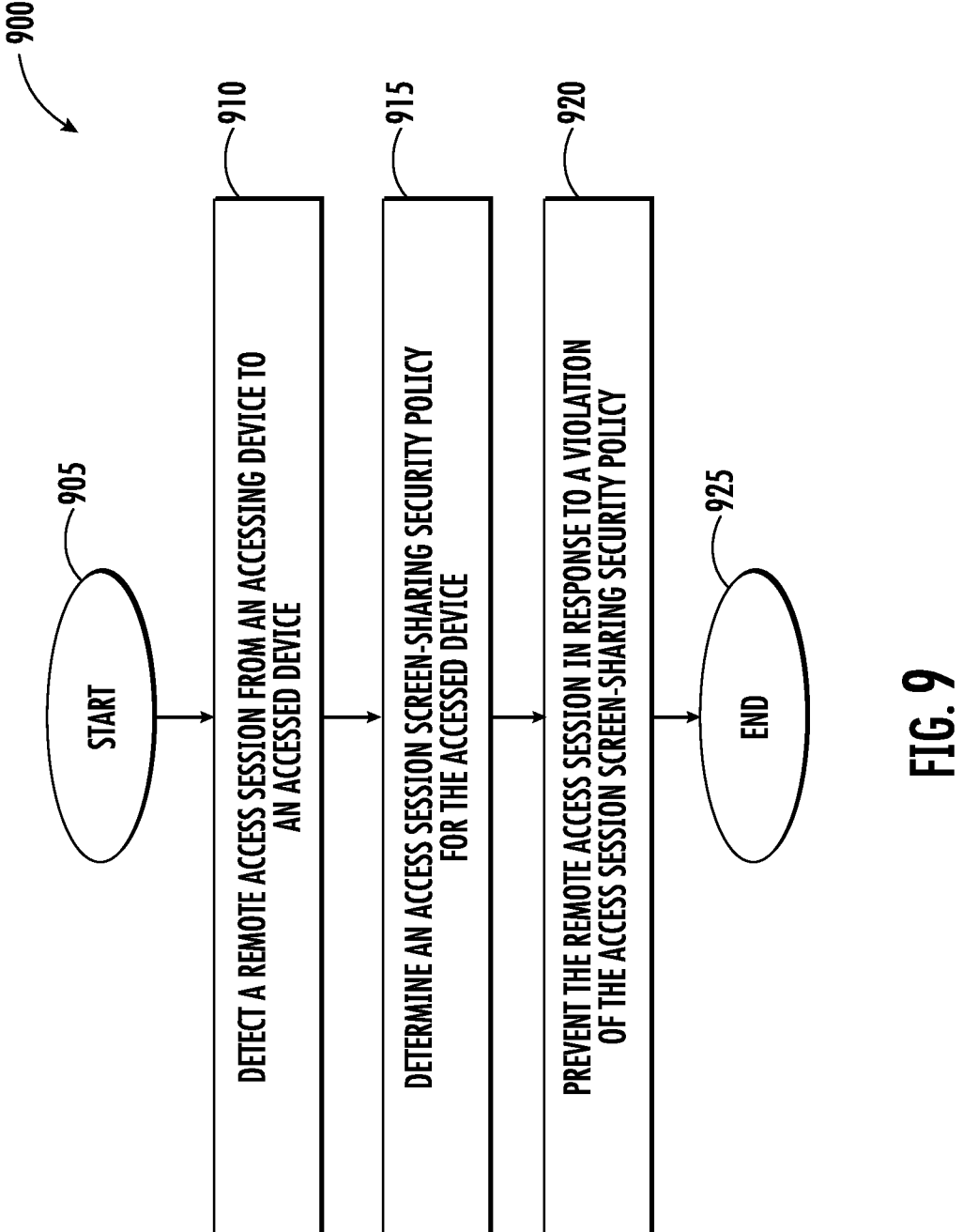
FIG. 9 illustrates an example simplified procedure for secure equipment access with screen monitoring enforcement, in accordance with one or more embodiments described herein.

FIG. 9 illustrates an example simplified procedure for secure equipment access with screen monitoring enforcement, in accordance with one or more embodiments described herein. For example, a non-generic, specifically configured device (e.g., device 200) may perform procedure 900 by executing stored instructions (e.g., screen monitoring enforcement process 248).

The procedure 900 may start at step 905, and continues to step 910, where, as described in greater detail above, a remote access session from an accessing device to an accessed device may be detected. For example, an attempt to initiate a remote access session between the accessing device and an accessed device may be recognized. The accessed device may be an Internet of Things (IoT) device.

At step 915, an access session screen-sharing security policy for the accessed device may be determined. The access session screen-sharing security policy may include a requirement of full screen sharing by the accessing device. The access session screen-sharing security policy may include a requirement of limited or singular screen utilization by the accessing device. The access session screen-sharing security policy may include a requirement of full screen sharing by the accessing device of all display screens of the accessing device.

As detailed above, at step 920, the remote access session may be prevented in response to a violation of the access session screen-sharing security policy. The violations may be detected by monitoring the remote access session. Monitoring the remote access session may be performed via one or both of either real-time monitoring or session recording. In various embodiments, the remote access session may be browser-based, and preventing the remote access session may comprise browser-based enforcement.

Detection of a violation of the access session screen-sharing security policy may be made in response to determining screen sharing by the accessing device is less than full screen sharing. Additionally, or alternatively, detecting the violation of the access session screen-sharing security policy may be made in response to determining window-based sharing by the accessing device. Moreover, detecting the violation of the access session screen-sharing security policy may be made in response to one of either determining screen sharing by the accessing device to be less than full screen sharing or determining multi-screen utilization by the accessing device. In some instances, detecting the violation of the access session screen-sharing security policy may be made in response to determining screen sharing by the accessing device to be less than full screen sharing of all display screens of the accessing device.

Preventing the connection of the remote access session may include preventing the connection of the remote access session from the accessing device to the accessed device prior to connecting. Alternatively, or additionally, a screen sharing change by the accessing device during the remote access session that violates the access session screen-sharing security policy may be detected and the remote access session may be ceased in response to the screen sharing change. Such a screen sharing change may include stopping sharing, stopping recording, and/or adding an additional display screen.

In various embodiments, a periodic keepalive message from a screen sharing application on the accessing device may be initiated. Then, determining the violation of the access session screen-sharing security policy may be made in response to the periodic keepalive message failing to arrive from the screen sharing application on the accessing device for a set period of time.

The remote access session may be automatically prevented from beginning or continuing in response to detecting the violations. However, in some instances, the violation may be indicated via a user interface on the accessing device and/or an opportunity for correction of the violation via the user interface may be allowed before entirely terminating the remote access session.

Procedure 900 then ends at step 925.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for secure equipment access with screen monitoring enforcement. Notably, screen sharing is fairly ubiquitous for the purposes of IT support, collaboration, and the like. In addition, certain network security systems have also recently started to integrate screen recordings into their functionality. However, as noted above, the techniques herein go beyond simply screen recordings and integrates directly with the remote access sessions of the users, to make the sessions conditional on compliance with the screen recording policies.

According to the embodiments herein, an illustrative method herein may comprise: detecting, by a processor, a remote access session from an accessing device to an accessed device; determining, by the processor, an access session screen-sharing security policy for the accessed device; and preventing, by the processor, the remote access session in response to a violation of the access session screen-sharing security policy.

In one embodiment, the access session screen-sharing security policy requires full screen sharing by the accessing device, and the method further comprises: detecting the violation of the access session screen-sharing security policy in response to determining screen sharing by the accessing device to be less than full screen sharing. In one embodiment, the access session screen-sharing security policy requires full screen sharing by the accessing device, and the method further comprises: detecting the violation of the access session screen-sharing security policy in response to determining window-based sharing by the accessing device. In one embodiment, the access session screen-sharing security policy requires full screen sharing by the accessing device and singular screen utilization by the accessing device, and the method further comprises: detecting the violation of the access session screen-sharing security policy in response to one of either determining screen sharing by the accessing device to be less than full screen sharing or determining multi-screen utilization by the accessing device.

In one embodiment, the access session screen-sharing security policy requires full screen sharing by the accessing device of all display screens of the accessing device, and the method further comprises: detecting the violation of the access session screen-sharing security policy in response to determining screen sharing by the accessing device to be less than full screen sharing of all display screens of the accessing device. In one embodiment, the method further comprises preventing connection of the remote access session from the accessing device to the accessed device in response to non-compliance with the access session screen-sharing security policy prior to connecting.

In one embodiment, the method further comprises: detecting a screen sharing change by the accessing device during the remote access session that violates the access session screen-sharing security policy; and ceasing the remote access session in response to the screen sharing change. In one embodiment, the screen sharing change is one of: stopping sharing; stopping recording; or adding an additional display screen. In one embodiment, the method further comprises: initiating a periodic keepalive message from a screen sharing application on the accessing device; and determining the violation of the access session screen-sharing security policy in response to the periodic keepalive message failing to arrive from the screen sharing application on the accessing device for a set period of time. In one embodiment, the method further comprises: indicating, via a user interface on the accessing device, the violation; and allowing for correction of the violation via the user interface.

According to the embodiments herein, an illustrative tangible, non-transitory, computer-readable medium having computer-executable instructions stored thereon that, when executed by a processor on a computer, cause the computer to perform a method comprising: detecting a remote access session from an accessing device to an accessed device; determining an access session screen-sharing security policy for the accessed device; and preventing the remote access session in response to a violation of the access session screen-sharing security policy.

According to the embodiments herein, an illustrative apparatus comprising: one or more network interfaces to communicate with a network; a processor coupled to the one or more network interfaces and configured to execute one or more processes; and a memory configured to store a process that is executable by the processor, the process, when executed, configured to: detect a remote access session from an accessing device to an accessed device; determine an access session screen-sharing security policy for the accessed device; and prevent the remote access session in response to a violation of the access session screen-sharing security policy.

While there have been shown and described illustrative embodiments that provide for secure equipment access with screen monitoring enforcement, it is to be understood that various other adaptations and modifications may be made within the spirit and scope of the embodiments herein. For example, while certain protocols, browsers, devices, languages, etc., are shown, such, other suitable replacements may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

14

What is claimed is:

1. A method, comprising:
monitoring, by a processor and on an operation dashboard, a remote access session from an accessing device to an accessed device that allows the accessing device to invoke one or more operations in support of software processes executing remotely on the accessed device;
determining, by the processor, an access session screen-sharing security policy for the accessed device, wherein the access session screen-sharing security policy requires screen sharing of the remote access session by the accessing device with one or more viewing devices while the accessing device accesses the accessed device; and
preventing, by the processor, the accessing device from further accessing the accessed device through the remote access session when in violation of the access session screen-sharing security policy.

2. The method as in claim 1, wherein the access session screen-sharing security policy requires full screen sharing by the accessing device, the method further comprising:
detecting the violation of the access session screen-sharing security policy in response to determining screen sharing by the accessing device to be less than full screen sharing.

3. The method as in claim 1, wherein the access session screen-sharing security policy requires full screen sharing by the accessing device, the method further comprising:
detecting the violation of the access session screen-sharing security policy in response to determining window-based sharing by the accessing device.

4. The method as in claim 1, wherein the access session screen-sharing security policy requires full screen sharing by the accessing device and singular screen utilization by the accessing device, the method further comprising:
detecting the violation of the access session screen-sharing security policy in response to one of either determining screen sharing by the accessing device to be less than full screen sharing or determining multi-screen utilization by the accessing device.

5. The method as in claim 1, wherein the access session screen-sharing security policy requires full screen sharing by the accessing device of all display screens of the accessing device, the method further comprising:
detecting the violation of the access session screen-sharing security policy in response to determining screen sharing by the accessing device to be less than full screen sharing of all display screens of the accessing device.

6. The method as in claim 1, further comprising:
preventing connection of the remote access session from the accessing device to the accessed device in response to non-compliance with the access session screen-sharing security policy prior to connecting.

7. The method as in claim 1, further comprising:
detecting a screen sharing change by the accessing device during the remote access session that violates the access session screen-sharing security policy; and
ceasing the remote access session in response to the screen sharing change.

8. The method as in claim 7, wherein the screen sharing change is one of: stopping sharing; stopping recording; or adding an additional display screen.

9. The method as in claim 1, further comprising:
initiating a periodic keepalive message from a screen sharing application on the accessing device; and determining the violation of the access session screen-sharing security policy in response to the periodic keepalive message failing to arrive from the screen sharing application on the accessing device for a set period of time.

10. The method as in claim 1, further comprising:

indicating, via a user interface on the accessing device, the violation; and allowing for correction of the violation via the user interface.

11. The method as in claim 1, further comprising:

monitoring the remote access session via one or both of either real-time monitoring or session recording.

12. The method as in claim 1, wherein the remote access session is browser-based, and wherein preventing the remote access session comprises browser-based enforcement.

13. The method as in claim 1, wherein the accessed device is an Internet of Things (IoT) device.

14. A tangible, non-transitory, computer-readable medium having computer-executable instructions stored thereon that, when executed by a processor on a computer, cause the computer to perform a method comprising:

monitoring, on an operation dashboard, a remote access session from an accessing device to an accessed device that allows the accessing device to invoke one or more operations in support of software processes executing remotely on the accessed device;

determining an access session screen-sharing security policy for the accessed device, wherein the access session screen-sharing security policy requires screen sharing of the remote access session by the accessing device with one or more viewing devices while the accessing device accesses the accessed device; and preventing the accessing device from further accessing the accessed device through the remote access session when in violation of the access session screen-sharing security policy.

15. The tangible, non-transitory, computer-readable medium as in claim 14, wherein the access session screen-sharing security policy requires one or more of: full screen sharing by the accessing device, singular screen utilization by the accessing device, or full screen sharing by the accessing device of all display screens, the method further comprising:

detecting the violation of the access session screen-sharing security policy in response to one or more of: determining screen sharing by the accessing device to be less than full screen sharing; determining window-based sharing by the accessing device; or determining screen sharing by the accessing device to be less than full screen sharing of all display screens of the accessing device.

16. The tangible, non-transitory, computer-readable medium as in claim 14, further comprising:

preventing connection of the remote access session from the accessing device to the accessed device in response to non-compliance with the access session screen-sharing security policy prior to connecting.

17. The tangible, non-transitory, computer-readable medium as in claim 14, further comprising:

detecting a screen sharing change by the accessing device during the remote access session that violates the access session screen-sharing security policy; and ceasing the remote access session in response to the screen sharing change.

18. The tangible, non-transitory, computer-readable medium as in claim 14, further comprising:

initiating a periodic keepalive message from a screen sharing application on the accessing device; and determining the violation of the access session screen-sharing security policy in response to the periodic keepalive message failing to arrive from the screen sharing application on the accessing device for a set period of time.

19. The tangible, non-transitory, computer-readable medium as in claim 14, further comprising:

indicating, via a user interface on the accessing device, the violation; and allowing for correction of the violation via the user interface.

20. An apparatus, comprising:

one or more network interfaces to communicate with a network;

a processor coupled to the one or more network interfaces and configured to execute one or more processes; and a memory configured to store a process that is executable by the processor, the process, when executed, configured to:

monitor, on an operation dashboard, a remote access session from an accessing device to an accessed device that allows the accessing device to invoke one or more operations in support of software processes executing remotely on the accessed device;

determine an access session screen-sharing security policy for the accessed device, wherein the access session screen-sharing security policy requires screen sharing of the remote access session by the accessing device with one or more viewing devices while the accessing device accesses the accessed device; and prevent the accessing device from further accessing the accessed device through the remote access session when in violation of the access session screen-sharing security policy.

* * * * *